(12) United States Patent
Wareham et al.

(10) Patent No.: US 7,030,514 B2
(45) Date of Patent: Apr. 18, 2006

(54) POWER TRANSFER SWITCH ASSEMBLY

(75) Inventors: Paul Wareham, Sydney (CA); David Langham, Sydney (CA)

(73) Assignee: DynaGen Technologies Incorporated, Sydney (CA)

( * ) Notice: Subject to any disclaimer, the term of this patent is extended or adjusted under 35 U.S.C. 154(b) by 520 days.

(21) Appl. No.: 10/219,300

(22) Filed: Aug. 16, 2002

(65) Prior Publication Data

US 2003/0034693 A1    Feb. 20, 2003

Related U.S. Application Data

(60) Provisional application No. 60/312,765, filed on Aug. 17, 2001.

(51) Int. Cl.
*H01H 35/00* (2006.01)

(52) U.S. Cl. ............ 307/126; 307/64; 307/328

(58) Field of Classification Search ............... 307/64, 307/328, 126; 439/135, 144, 928
See application file for complete search history.

(56) References Cited

U.S. PATENT DOCUMENTS

| | | | |
|---|---|---|---|
| 3,654,484 A | | 4/1972 | Jorgenson et al. |
| 4,258,968 A | | 3/1981 | Holt |
| 4,314,738 A | | 2/1982 | Davis et al. |
| 5,088,004 A | * | 2/1992 | Howell ............... 361/669 |
| 5,134,544 A | | 7/1992 | Howell |
| 5,268,850 A | | 12/1993 | Skoglund |
| 5,347,167 A | | 9/1994 | Singh |
| 5,761,027 A | | 6/1998 | Flegel |
| 5,797,757 A | * | 8/1998 | Aoki ................... 439/101 |
| 6,074,246 A | * | 6/2000 | Seefeldt et al. ......... 439/517 |
| 6,107,701 A | | 8/2000 | Flegel |
| 6,154,488 A | * | 11/2000 | Hunt ................... 375/219 |
| 6,172,432 B1 | | 1/2001 | Schnackenberg et al. |
| 6,188,145 B1 | | 2/2001 | Stewart |
| 6,300,881 B1 | * | 10/2001 | Yee et al. ............ 340/870.02 |
| 6,420,801 B1 | * | 7/2002 | Seefeldt .................. 307/64 |
| 6,545,374 B1 | * | 4/2003 | Allenbach ............... 307/125 |
| 6,751,563 B1 | * | 6/2004 | Spanier et al. ............ 702/61 |
| 6,798,351 B1 | * | 9/2004 | Sorrells et al. ......... 340/870.02 |

* cited by examiner

*Primary Examiner*—Brian Sircus
*Assistant Examiner*—Brett Squires
(74) *Attorney, Agent, or Firm*—Anne Kinsman; Borden Ladner Gervais LLP

(57) ABSTRACT

A modularly attachable transfer switch assembly for operative connection to two alternate power sources and a power load is disclosed. The transfer switch can be quickly and easily installed upon existing electrical meters and therefore does not require modifications to existing electrical wiring systems. The transfer switch includes one power switch for selectively connecting a electrical utility power supply to the power load of a structure, such as a building for example, and a second power switch for selectively connecting an emergency power supply to the power load of the building. The transfer switch includes a mechanical interlock operatively connected to both the power switches for physically preventing both the power switches from assuming simultaneous ON positions, and a controller for controlling the emergency power supply and the transfer switches. The transfer switch is enclosed within a casing adapted for connection between a watt-hour meter and a meter socket of existing service installations for simple installation of the transfer switch.

12 Claims, 7 Drawing Sheets

POWER TRANSFER SWITCH ASSEMBLY

This application claims priority from U.S. provisional patent application Ser. No. 60/312,765, filed Aug. 17, 2001.

FIELD OF THE INVENTION

The present invention relates to electrical switching assemblies. In particular, the present invention relates to transfer switch assemblies for interconnecting power to a building from two alternate power supplies.

BACKGROUND OF THE INVENTION

Customers of electric utility companies often desire a back-up electrical power supply during a power outage. Typically, such a back-up is provided by an alternate power supply such as a fuel-fired engine-driven power generator, an inverter, solar cells or fuel cells, for example. A common method used is the installation of a power generator which is interfaced with an automatic or manual transfer switch that is capable of simultaneously disconnecting the electric utility (mains) power supply and connecting the alternate power supply to the facility loads.

Manual transfer switches usually require an operator to first start the power generator, and then actuate a handle in order to initiate the power transfer. Automatic transfer switches enable unattended operation where monitoring circuits automatically detect power disturbances, initiate automatic starting of the generator system, and proceed to transfer power from one supply to the other using an electrically operated mechanism. The process is reversed when power is restored.

Among the problems typically confronting a user of electricity wishing to install a back-up power supply is the installation complexity of a traditional transfer switch. Installation of either manual or automatic transfer switches requires extensive modification of the user's electrical wiring system in the facility. This is an expensive process as it must be performed by electrical professionals and it is a time consuming process due to safety concerns and the requirement for compliance with various safety standards. In many cases, this also involves separating the critical loads that the user wishes to back-up by connecting them to a sub-panel, which in turn is connected to the transfer switch. In this scenario, only those loads connected to the sub-panel are capable of drawing power from the generator system, which is inconvenient for many users.

Accordingly, it is desirable to provide a transfer switch where power is switched ahead of the facility's service entrance means to permit the engagement of any load within the facility. This allows the purchaser to avoid the installation of an electrical sub-panel and increases the convenience to the user. Still further, it is desirable to provide a rapid and inexpensive means to install a transfer switch for engagement with the electrical system.

SUMMARY OF THE INVENTION

It is an object of the present invention to obviate or mitigate at least one of the disadvantages described above. More specifically, it is an object of the present invention to provide a power transfer switch for switching power supplies to a building or structure that requires power. More specifically, it is an object of the present invention to provide a power transfer switch that is simple to install and does not require modification of the existing electrical system of the building.

In a first aspect, the present invention provides a power transfer switch assembly modularly attachable to a service installation meter, for selectively connecting one of a main power supply and an alternate power supply to a power load. The power transfer switch includes a first power switch switchable between an ON state and an OFF state, a second power switch switchable between an ON state and an OFF state, a mechanical interlock having a locking actuator mechanically coupled to the first and the second power switches, a controller for monitoring the main power supply, and a casing containing the first power switch, the second power switch, the mechanical interlock and the controller. The first power switch receives the main power supply for coupling the main power supply to the power load in the ON state. The second power switch receives the alternate power supply for coupling the alternate power supply to the power load in the ON state. The mechanical interlock physically prevents the first power switch and the second power switch from assuming simultaneous ON states. The controller switches the first power switch to the OFF state and the second power switch to the ON state when a disturbance in the main power supply is detected, and switches the second power switch to the OFF state and the first power switch to the ON state when the main power supply is restored. The casing includes load terminals and line terminals for connection with a meter socket of the service installation, and line out and line in feed terminals for connection with a watt-hour meter of the service installation. The load terminals are connected to the first and second power switches, the line terminals are connected to the line out feed terminals, and the line in feed terminals are connected to the first power switch. In an alternate embodiment of the present aspect, the casing receives the main power supply from the line terminals and the alternate power supply from a cable.

In further embodiments of the present aspect, the controller includes a remote communication system for exchanging information with a remote interface unit. The remote communication system includes hard wired twisted pair communications cable, a power line communications modem or a wireless radio frequency modem. The remote interface unit includes a stand-alone user interface display, a personal computing device or a personal computer, where the personal computing device includes a personal digital assistant.

BRIEF DESCRIPTION OF THE DRAWINGS

Embodiments of the present invention will now be described, by way of example only, with reference to the following drawings, in which.

DETAILED DESCRIPTION OF THE INVENTION

A modularly attachable transfer switch assembly for operative connection to two power sources and a power load is disclosed. The transfer switch can be quickly and easily installed upon existing service installations, and includes one power switch for selectively connecting a electrical utility power supply to the power load of a structure, such as a building for example, and a second power switch for selectively connecting an emergency power supply to the power load of the building. The transfer switch includes a mechanical interlock operatively connected to both the power switches for physically preventing both the power switches from assuming simultaneous ON positions, and a controller for controlling the emergency power supply and the transfer switches. Upon loss or disturbance in the electrical utility power supply, the transfer switch will automatically activate the emergency power supply, disconnect the utility power supply from the building and connect the emergency power supply to the building. When the electrical utility power supply returns to normal operating levels, the transfer switch then automatically disconnects the emergency power supply and reconnects the utility power supply to the building. The transfer switch is enclosed within a casing adapted for connection between a watt-hour meter and a meter socket of existing service installations for simple installation of the transfer switch.

Figure 1:
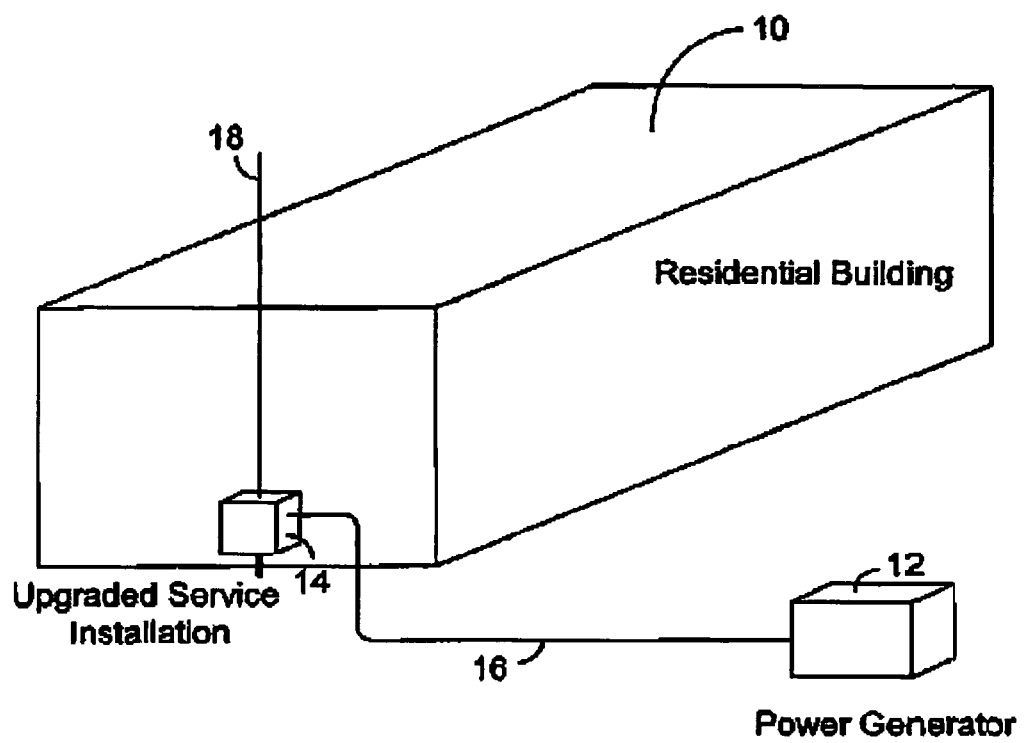
FIG. 1 is a schematic overview of the deployment of the power transfer switch at a building in accordance with an embodiment of the present the invention.
Figure 2:
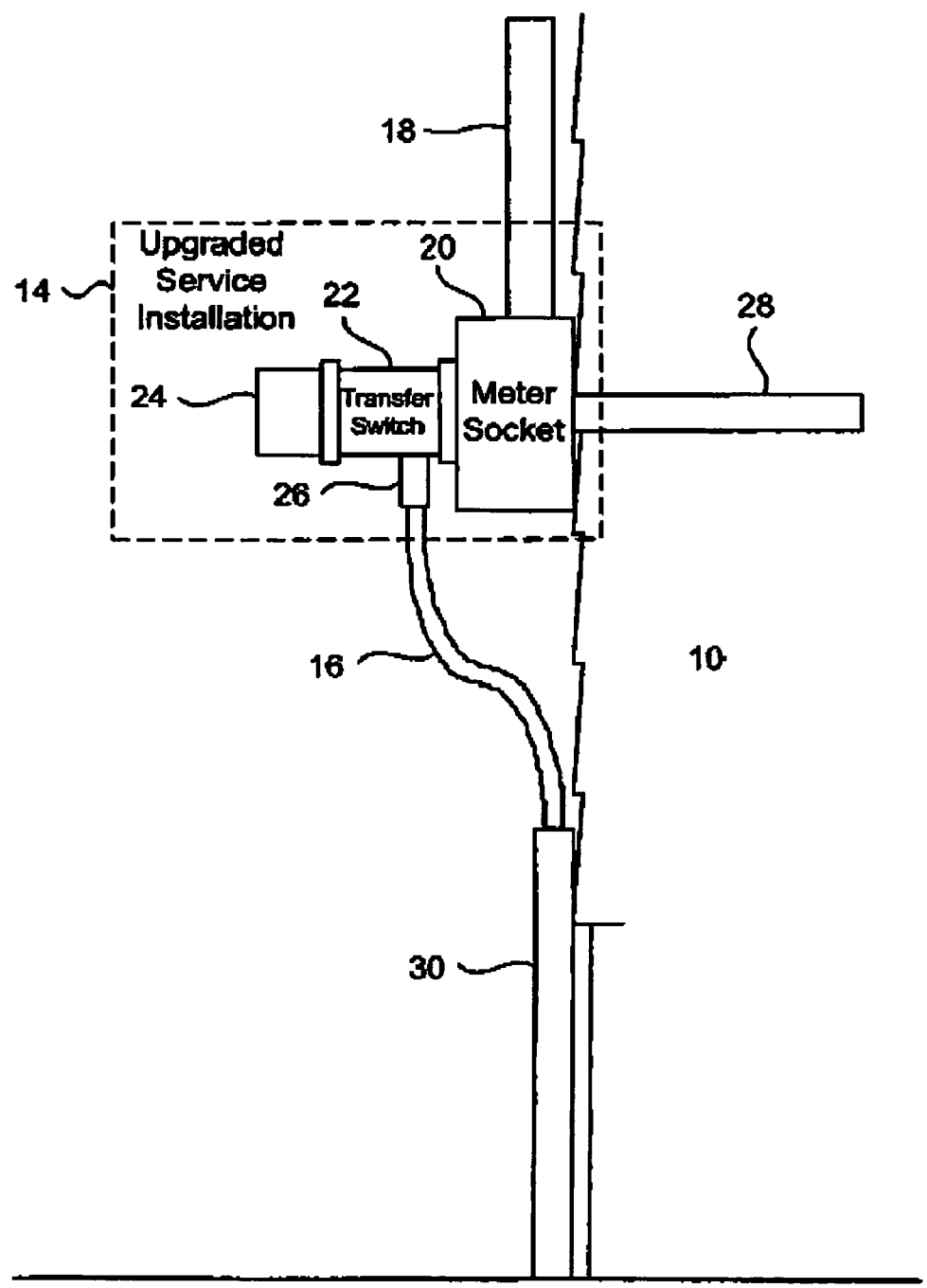
FIG. 2 is a detailed diagram of the service installation of FIG. 1.

FIG. 1 illustrates a preferred application of the transfer switch embodiment of the present invention. A structure requiring power, such as a residential building 10, has a power generator 12 for supplying emergency power to an upgraded service installation 14 through cable 16. The upgraded service installation 14 has a transfer switch modularly attached between the meter socket and the watt-hour meter of the upgraded meter installation 14, as will be shown in more detail in FIG. 2. Main power from the utility is supplied to the upgraded service installation 14 through main power cable 18, which includes a power cable routed from overhead. Alternatively, the main power cable can be routed underground. In the present example, the transfer switch of the upgraded service installation 14 receives the emergency power from cable 16. Because of the modular nature of the transfer switch, its installation upon existing service installations is simple, quick and minimizes the possibility of wiring errors. Furthermore, there is no need to modify the electrical wiring system of the building 10. Details of the upgraded service installation 14 are shown in FIG. 2. In the event that main power from an electric utility delivered through main power cable 18 becomes unavailable or is disturbed, the transfer switch installed upon the upgraded service installation 14 substitutes the main power from the electric utility with power from the power generator 12. Preferably, the switch over is automatically performed to minimize inconvenience to the user.

FIG. 2 illustrates the upgraded service installation 14 of FIG. 1 in further detail. Upgraded service installation 14 is mounted to the wall of the building 10 for receiving main power through main power cable 18 and emergency power from power generator 12 through cable 16. Upgraded service installation 14 includes a meter socket 20, transfer switch 22 according to an embodiment of the present invention, and a watt-hour meter 24. The transfer switch 22 is small enough to fit within meter socket 20, and includes a set of contact terminals on the load side, and a mirrored set of contact terminals on the side for connection to the watt-hour meter 24, which permits quick push-in connection to the electrical system. Meter socket 20 is connected to main power cable 18 and an internal power conduit 28. The internal power conduit 28 routes power received by the upgraded service installation 14 to a distribution panel inside the building 10. One end of transfer switch 22 is mounted onto meter socket 20 for receiving the main power supply via meter socket 20, and directly receives the emergency power from cable 16 through any standard plug and socket interface 26. For example, standard twist lock or pin sleeve weatherproof connectors can be used for interface 26. Watt-hour meter 24 displays the power consumed for meter readings, and is mounted to the other end of transfer switch 22. A rigid conduit 30 serves to protect the cable 16 as it is routed along the wall of building 10.

During normal operation, where building 10 receives main power from the electric utility, upgraded service installation 14 operates as a standard service installation would. This is because main power is routed through the transfer switch 22 to the watt-hour meter 24, and then from the watt-hour meter 24 back through transfer switch 22 to internal power conduit 28. During emergency operation where the main power is disturbed or unavailable, the transfer switch 22 effectively disconnects main power cable 18 from internal power conduit 28. Transfer switch 22 then connects cable 16 to internal conduit 28. Thus, transfer switch 22 essentially replaces the direct power connection between the watt-hour meter 24 and internal power conduit 28 with a pair of switches that selectively connect and disconnect main power and emergency power to the internal power conduit 28.

Figure 3:
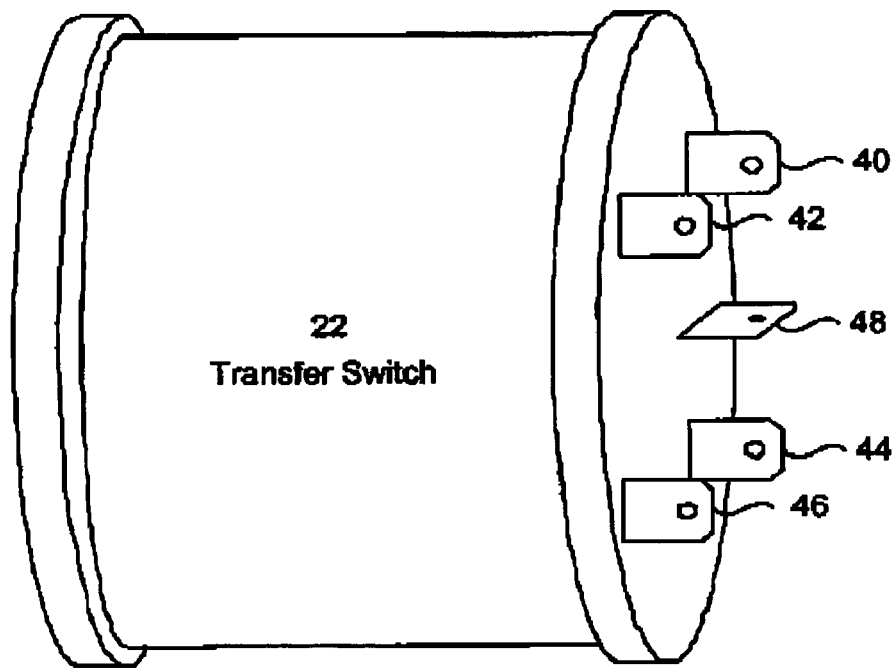
FIG. 3 is a diagram of the transfer switch of FIG. 2.

To install the transfer switch 22 to an existing service installation, the existing watt-hour meter is first removed from its meter socket and unplugged from the building to expose the electrical contacts. The transfer switch 22 is then connected to the meter socket, and the watt-hour meter is connected to the transfer switch 22. Finally, the cable from the power generator or other alternate power supply is connected to the transfer switch 22. Those of skill in the art will understand that the casing of the transfer switch 22 includes male prong terminals adapted to fit in female prong terminals in the meter socket. Accordingly, the casing also includes female prong terminals for receiving the male prong terminals of the watt-hour meter. Therefore the push-in connection of the transfer switch 22 to the meter socket 20, and the push-in connection of the watt-hour meter 24 to the transfer switch is a simple and quick error-free procedure for retrofitting existing service installations FIG. 3 is a diagram of the transfer switch casing 22 of FIG. 2 showing a layout of the male prong terminals discussed above. The face of transfer switch 22 shown in FIG. 3 has a pair of line terminals shown as male prong terminals 40 and 42, for receiving main power from main power cable 18, a pair of load terminals shown as male prong terminals 44 and 46, for providing either main power or emergency power to internal power conduit 28. A fifth neutral terminal 48 is provided for an alternate embodiment of the present invention to be discussed later. In this particular embodiment, all male prong terminals 40, 42, 44 and 46 are identically oriented and positioned in a square or rectangular pattern. Accordingly, the pattern of these prong terminals is the same as the pattern for the terminals of the watt-hour meter 24. The neutral terminal 48 is rotated 90 degrees relative to the other prong terminals, and positioned between prong terminals 40 and 44. As previously mentioned, the hidden face of transfer switch 22 includes female prong terminals having the same pattern as male prong terminals 40, 42, 44 and 46 in order to receive the watt-hour meter 24. Although not shown, transfer switch 22 includes a socket for receiving emergency power from cable 16.

Figure 4:
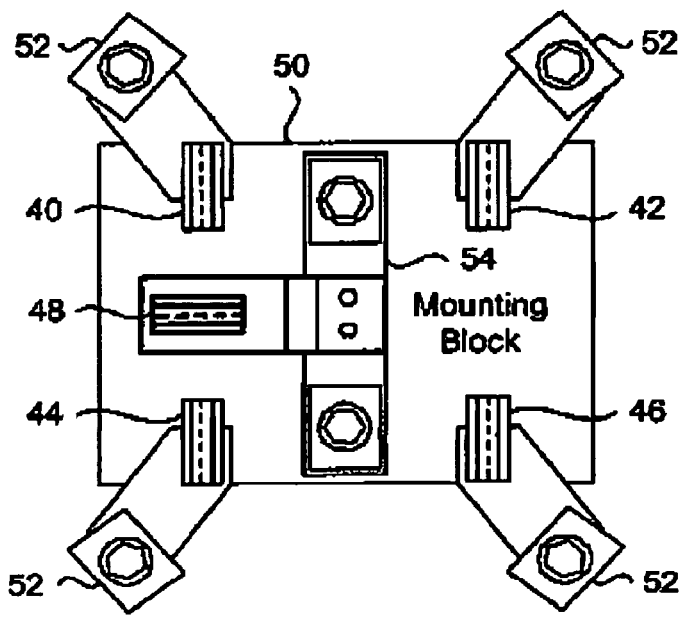
FIG. 4 is a diagram of the inside face of the transfer switch of FIG. 3.

FIG. 4 is a diagram of the inside face of transfer switch 22 shown in FIG. 3. More specifically, FIG. 4 shows the inside face of the transfer switch end having male prong terminals. All the male prong terminals are supported within insulated mounting block 50, each being connected to a respective conducting terminal 52 except neutral terminal 48 that is connected to a neutral bus and conducting terminal 54. When assembled as a transfer switch 22, conducting terminals 52 and 54 are connected to components within it. FIG. 4 further illustrates the relative arrangement of the male prong terminals with respect to each other.

Figure 5:
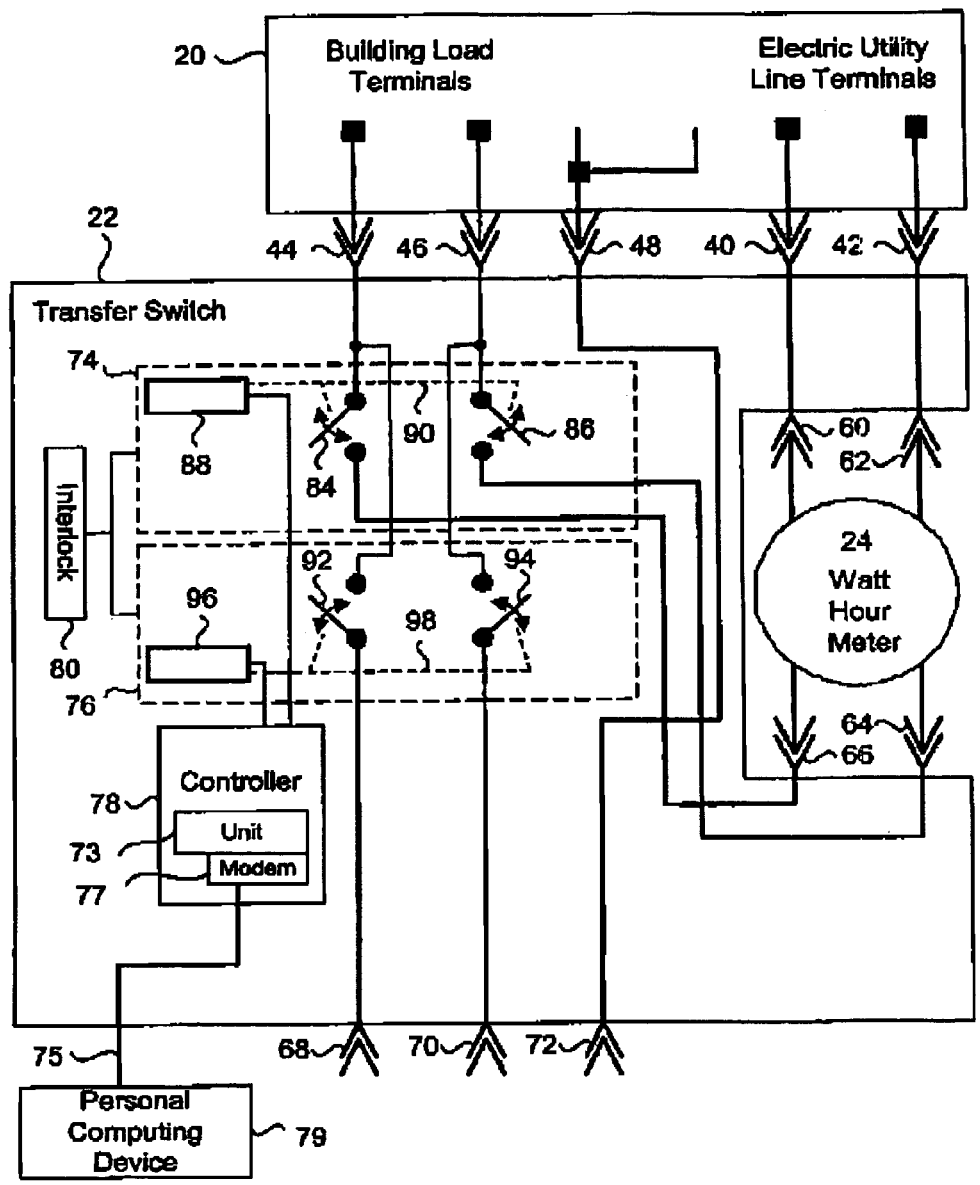
FIG. 5 is a circuit diagram of the transfer switch of FIGS. 2 and 3 installed between a meter socket and a watt-hour meter.

A detailed description of the transfer switch according to an embodiment of the present invention now follows with reference to the system circuit schematic of FIG. 5. The transfer switch of the present embodiment is a self enclosed system that performs power detection and power switching functions according to the status of the main power supply delivered through the main power cable 18 of FIG. 2. FIG. 5 illustrates the electrical interconnection between meter socket 20, transfer switch 22, and watt-hour meter 24 shown in FIG. 2, as well as the circuit diagram for transfer switch 22 according to an embodiment of the present invention. Many of the reference numerals in FIG. 5 correspond to the same numbered reference numerals appearing in FIGS. 2 and 3.

In FIG. 5, transfer switch 22 is interconnected to meter socket 20 through terminals 40, 42, 44, 46 and 48 as previously discussed, and interconnected to watt-hour meter 24 through its terminals 60, 62, 64 and 66. Terminals 60 and 62 are line out feed terminals and terminals 64 and 66 are line in feed terminals, both for connecting with the watt-hour meter 24. Main power provided through meter socket 20 via terminals 40 and 42 is routed directly through transfer switch 22 to watt-hour meter 24 through terminals 60 and 62. The main power is then returned to transfer switch 22 through terminals 64 and 66. The alternate power supply is connected to power generator terminals 68, 70 and 72. Power from either the main power supply or the alternate power supply is supplied to the building through the meter socket 20 via terminals 44 and 46. Transfer switch 22 includes a pair of power switches 74 and 76, a controller 78 and a mechanical interlock 80. Power switch 74 receives main power from terminals 64 and 66, and has an output connected to terminals 44 and 46. Power switch 76 receives emergency power from terminals 68 and 70, and also has its output connected to terminals 44 and 46. Controller 78 provides a switching signal to each power switch, and mechanical interlock 80 physically prevents both power switches 74 and 76 from assuming the ON state. It should be understood that in the ON state, each power switch is in a conductive state to couple its input to its output. Otherwise in the OFF state, each power switch is in a non-conductive state. The physical interaction between the mechanical interlock and both power switches according to the present embodiment is described in more detail later with reference to FIGS. 6 and 7. Generally, power switches 74 and 76 perform a multiplexing function in accordance with the switching signals provided by the controller 78.

The controller 78 is responsible for a variety of functions in addition to providing switching signals to the power switches. According to an embodiment of the present invention, controller 78 senses main power voltage and frequency, power generator voltage and frequency, provides a start signal to the power generator, performs all the required start-up actions, re-transfer to normal delays, and logic functions as well as communications to optional power control systems of the building. If the power generator has an engine control unit, the engine control unit will handle generator operation in response to the start signal received from controller 78. Although additional connections to and from controller 78 are not shown in FIG. 5 to simplify the schematic, those of skill in the art will understand these additional connections would be present to enable its other functions.

Each power switch is now described in further detail. Power switches 74 and 76 are commercially available components, and generally include a pair of mechanical switching elements and a solenoid for actuating the mechanical switching elements between their ON and OFF states. One such power switch is the Series 36, 200 Amp switch from BLP Components Limited for example. Power switch 74 includes mechanical switching elements 84 and 86 for selectively coupling terminals 66 and 64 to terminals 44 and 46 respectively. Solenoid 88 receives a switching signal from controller 78 for actuating mechanical switching elements 84 and 86 via switch actuating line 90. Power switch 76 includes mechanical switching elements 92 and 94 for selectively coupling terminals 68 and 70 to terminals 44 and 46 respectively. Solenoid 96 receives a switching signal from controller 78 for actuating mechanical switching elements 92 and 94 via switch actuating line 98. Mechanical interlock 80 being a non-electrical component of transfer switch 22, is physically coupled to both power switches 74 and 76 and shown in FIG. 5 and does not provide or receive any electrical signals.

The operation of transfer switch 22 is now described. During normal operation when the main power supply, typically the electric utility, is available, switch elements 84, 86 are closed and switch elements 92, 94 are open. Accordingly power switch 74 is in the ON state and power switch 76 is in the OFF state, allowing transfer switch 22 to supply the building with power from the electric utility. When controller 78 detects a disturbance in the main power supply, a start signal is sent to the power generator to initiate emergency power generation. Controller 78 then sends switching signals to power switches 74 and 76 such that power switch 74 is switched to the OFF position to open switch elements 84, 86 and power switch 76 is switched to the ON position to close switch elements 92, 94. Now the building receives power from the power generator via terminals 68 and 70. Controller 78 continues to monitor the main power supply, and proceeds to reverse the state of each power switch when the main power supply becomes available again.

Due to mechanical interlock 80, power switches 74 and 76 are physically limited to the following three combinations of states:

1) power switch 74 ON, power switch 76 OFF,
2) power switch 74 OFF, power switch 76 ON,
3) power switch 74 OFF, power switch 76 OFF.

A fourth possible combination, where both power switches are ON is physically prevented by mechanical interlock 80. The simultaneous connection of both the active main power supply and the active emergency power supply can cause electrical damage to the building. Furthermore, if the main power supply is inactive, the connection of the emergency power supply may result in the power generator transmitting power back through the main power cables, thereby presenting a possible electrical hazard to electric utility personnel working on the main power supply.

In the event that neither the main power supply or the alternate power supply is available, a battery backup system is included within transfer switch 22 to ensure that the controller 78 and power switches 74 and 76 are operable. The battery backup system would include a power supply for charging a battery, where the power supply can receive power from either the main power supply or the alternate power supply. Alternatively, the controller 78 and power switches 74 and 76 can receive power from the starting batteries of a power generator. This can be implemented by connecting a cable from the starting batteries to the transfer switch 22.

Figure 6:
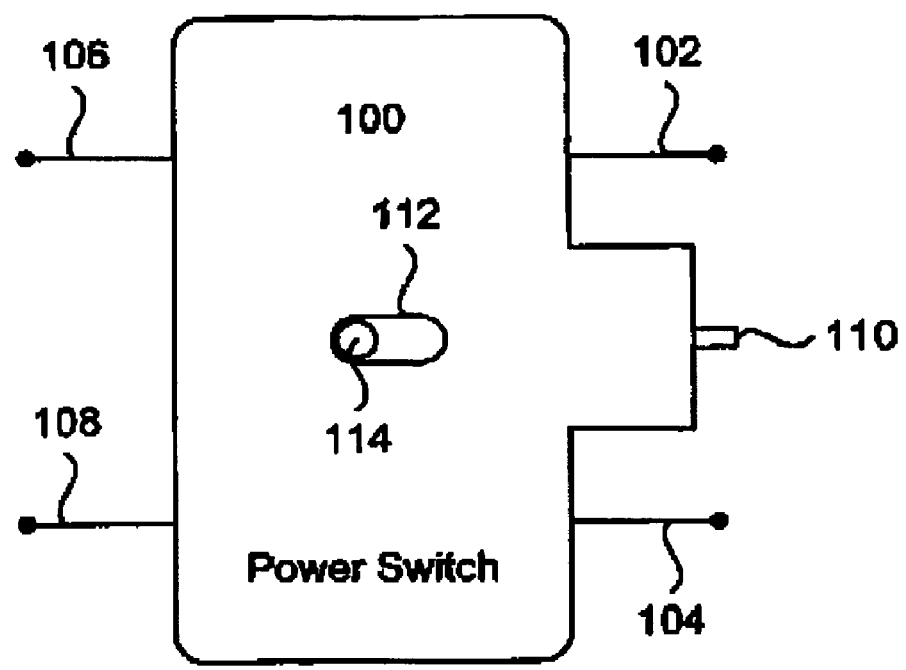
FIG. 6 is an illustration of a pair of modified power switches according to an embodiment of the present invention.
Figure 6:
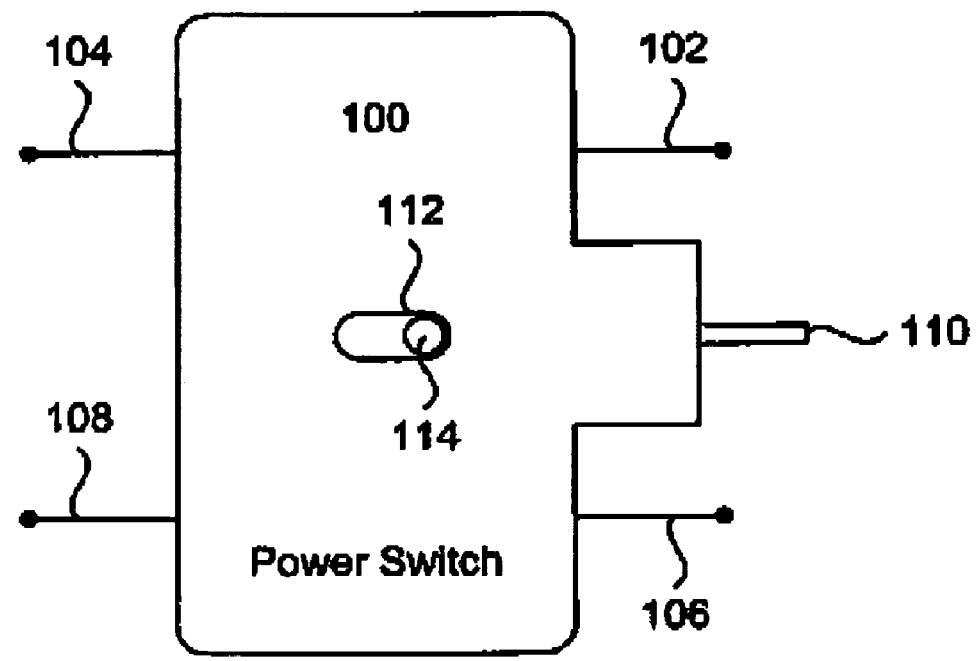
Figure 7:
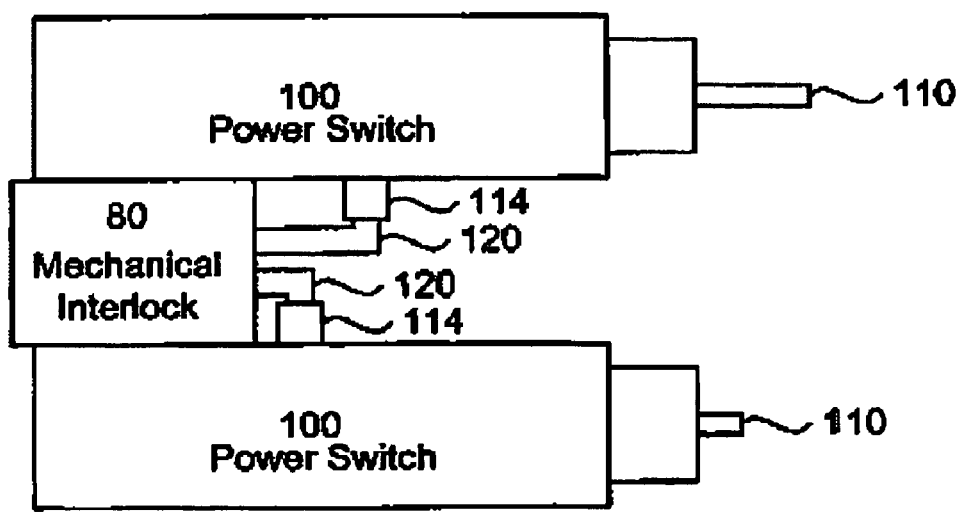
FIG. 7 is an illustration of the pair of modified power switches of FIG. 6 assembled with a mechanical interlock in accordance with an embodiment of the present invention.

FIG. 5 showed the power switches 74, 76 and mechanical interlock 80 as functional blocks within transfer switch 22. FIGS. 6 and 7 illustrate these components in their physical form to show their mechanical interactions with each other.

FIG. 6 is a side view of a pair of power switches, each representative of the Series 36, 200 Amp switch from BLP Components Limited. These power switches are suitable for use as power switches 74 and 76 in FIG. 5. Alternate power switches can be used, where each power switch is preferably a double pole, single-throw switch having rare earth magnets to ensure rapid actuation and high contact pressure between the switch contacts of the switching elements. Although the power switches are commercially available, minor modifications have been made to them for enabling lock-out of the simultaneous ON states of both power switches when mated with a mechanical interlock. In FIG. 6, the top power switch is illustrated in the OFF state while the bottom power switch is illustrated in the ON state. Each power switch 100 includes power switch terminals 102, 104, 106 and 108 and an actuator pin 110. Power switch terminals 102 and 106 are connected to each other in the ON state, as are power switch terminals 104 and 108. Actuator pin 110 is in sliding engagement with the power switch body, and is coupled to the internal switch element such that the pin slides in and out corresponding to the state of the power switch. The power switch can be switched to the OFF state manually by pushing in actuator pin 110. Modifications to the power switch include formation of opening 112 and installation of an interconnection member 114 on one side of each power switch 100. Opening 112 provides access to the internal switch element for connection of the interconnection member 114, which slides linearly along the opening 112 in accordance with the state of the power switch. Interconnection member 114 can be a cylindrical piece of suitable material retained on a nipple within the power switch at one end, with a suitable form at its opposite end for engaging a locking actuator of a mechanical interlock. In a preferred embodiment, the interconnection member 114 is a brass tube slotted at one end. The locking actuator and mechanical interlock are described in further detail with reference to FIG. 7.

The modified power switches of FIG. 6 are shown in an assembled configuration in FIG. 7, in which they are separated by a mechanical interlock 80, such as the illustrated lock out preventor having model number G269/1 by Lovato. It is noted that the power switch terminals are not shown for clarity of the diagram. If the power switches and mechanical interlock are assembled with the orientation shown in FIG. 6, then FIG. 7 shows a top view of the assembled mechanical interlock 80 and the modified power switches 100. Mechanical interlock 80 includes a locking actuator, such as the pair of L-shaped tabs 120 that are in sliding engagement with the body of mechanical interlock 80. The L-shaped tabs 120 are mechanically engaged with each other within the body of mechanical interlock 80 such that full extension of one L-shaped tab 120 inhibits extension of the other L-shaped tab 120. The end of each L-shaped tab 120 is connected to an interconnection member 114 such that movement of the L-shaped arm 120 follows that of the interconnection member 114 as it switches between the ON and OFF states. Mechanical interlock 80 prevents both power switches from being in the ON position at the same time. In other words, it prevents both actuator tubes 114 from shifting to the right-most position. In FIG. 7, the top-most power switch is in the ON state and the L-shaped tab 120 it is connected to is fully extended from mechanical interlock 80. The bottom-most power switch on the other hand, is in the OFF state and the L-shaped tab 120 it is connected to is fully withdrawn. Hence, if a first tab 120 is extended, it is mechanically impossible to extend the second tab 120. At this time, the first tab 120 can be withdrawn, setting both power switches in the OFF state. For the previously mentioned safety reasons, the internal mechanical system of mechanical interlock 80 prevents both the first and second tabs to be simultaneously extended to enable simultaneous ON states of both power switches. However, the internal mechanical system permits exactly one tab to be extended and both tabs to be withdrawn. The mechanical interlock 80 is preferably retained within a block of insulating material which provides physical separation and thermal and electrical insulation between the power switches.

Figure 8:
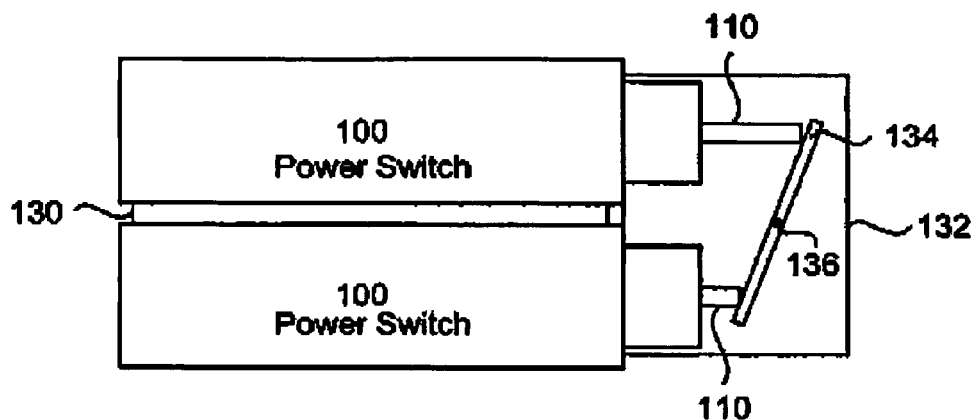
FIG. 8 is an illustration of a pair of power switches assembled with an alternate mechanical interlock in accordance with an embodiment of the present invention; and, FIG. 9 is a side view of the assembly shown in FIG. 8.
Figure 9:
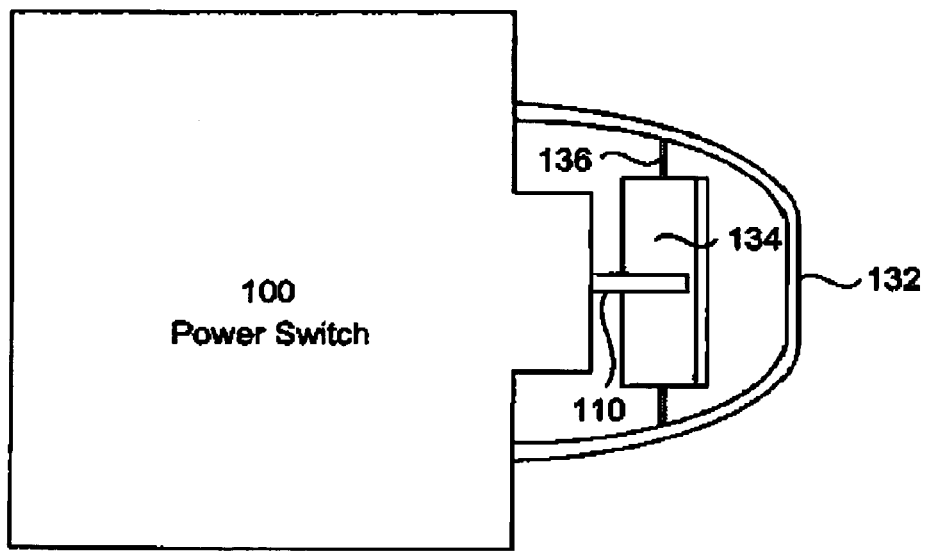

An alternative mechanical interlock system that does not require modifications to the power switches is shown in FIGS. 8 and 9. FIG. 8 shows a top view of a pair of unmodified power switches assembled in the same configuration as the assembly of FIG. 7. FIG. 9 shows a side view of the assembly of FIG. 8. The configuration of the power switches is similar to the configuration shown in FIG. 7, except that an insulating spacer 130 is sandwiched between the two power switches. It is noted that the power switch terminals are not shown for clarity of the diagram. The alternative mechanical interlock includes a U-shaped bracket 132 having its ends secured to the bodies of both power switches 100. The locking actuator is a rocking bar 134 pivotally connected to the walls of the U-shaped bracket 132 through a central pivot, and the ends of the rocking bar 134 are in contact with a respective actuator pin 110.

In operation, rocking bar 134 ensures that both actuator pins 110 never extended in the ON state at the same time. If a first actuator pin is already extended in the ON state, the second actuator pin can push the first actuator pin to the OFF state when the second actuator pin is switched to the ON state. Additionally, both actuator pins 110 can simultaneously retract to the OFF state.

The previously described transfer switch components, including power switches, controller and the mechanical interlock, are preferably contained within a casing which allows modular attachment of the transfer switch between the meter socket and watt-hour meter of a service installation at a building. Furthermore, re-wiring of the building or modification to the existing electrical system is avoided in order to provide the capability for automatically coupling either the main power supply or an emergency power supply to the building.

In an alternate embodiment of the present invention, the transfer switch is mated to a permanently installed power generator, and the wiring connection between the power generator and the transfer switch is permanent. For example, wires from the cable can be attached to terminals of the transfer switch casing via screw down connectors, or other suitable means for attaching the cable to the transfer switch terminals. Preferably in the present alternate embodiment, the typical wiring method will be via a cable in a rigid conduit such as metal or PVC above ground or underground, depending on the application. An electrical junction box is preferably mated to the casing of the transfer switch itself. To avoid running the rigid conduit directly to the electrical junction box, a length of flexible watertight conduit is coupled to the rigid conduit. The cable 16 can then be pulled into the electrical junction box. Lead conductors from the transfer switch will be provided in the electrical junction box complete with barrel type mechanical connectors and insulating boots to allow for quick and easy connection without the need for special crimping tools.

It should be understood to those of skill in the art that the aforementioned embodiments of the present invention can be used with 50 A generators. In an aspect of the present alternate embodiment the transfer switch can be used with 200 A generators. In the present aspect, the electrical junction box is inserted in line between the cable plug 26 and cable 16 in FIG. 2 due to the size of the junction box required to allow for 200 A wire installation. Furthermore, the size of the 200 A wire (2/0 awg Cu) imposes specific wiring requirements to the neutral conductor 48 shown in FIGS. 3 and 4 due to the limited amount of available space in meter socket 20 of FIG. 2. For example, a fifth 200 A plugable terminal can be installed into the existing meter socket 20, where the plugable terminal consists of a copper or aluminum bus custom formed to be able to be retrofitted with relative ease into the meter socket. Then the neutral terminal 48 of the transfer switch can be plugged into the fifth plugable terminal. Alternatively, a flexible lead can be installed in the existing meter socket instead of a plugable terminal. The flexible lead can consist of a custom fabricated plug to connect to the transfer switch, and connection to the service neutral would be via a tap connector, such as either a split bolt connector or insulation displacement connector. The plug connector would then attach to the transfer switch prior to installing it into the meter socket via a bus bar extension from the transfer switch, and held in place with a thumbscrew. Using extra flexible conductor would allow the installer to complete the installation by pushing the meter into place. There are many possible methods to interconnect a 200 A line to the transfer switch, which would be obvious to those of skill in the art.

In further alternate embodiments of the described transfer switch, a mechanical interlock is not required because logic within the controller can ensure that both power switches are prevented from attaining simultaneous ON states. Hence any type of power switch can be used and customization of the power switches to accommodate a mechanical interlock is unnecessary.

In another alternative embodiment, FIG. 5 showed the transfer switch 22 includes remote communications system for exchanging data between the user via a remote interface unit 73 and the transfer switch 22, or the transfer switch 22 and the engine control unit of a power generator 12. The remote communication system can be integrated with the controller 78 of the transfer switch 22 since the controller 78 is capable of monitoring various operating parameters. The remote communication system can include a hard wired twisted pair communications cable 75 to the remote interface unit 73, a power line communications modem 77 embedded in the transfer switch controller 78 to communicate over the existing residential wiring to the remote interface unit 73, and a wireless radio frequency modem embedded in the control unit to communicate with the remote interface unit 73. The remote interface unit 73 can include a stand-alone user interface display, which displays the status of the switch, giving position, generator status end normal supply status. Alternately, the remote interface unit 73 can be an interface unit allowing the user via software to view the status information on a personal computing device 79 (PC, Laptop, PDA). The communication link would allow bi-directional communication between the user interface device and the switch unit allowing the user to adjust settings and perform system tests. The communication link may also be employed to work in conjunction with optional power control systems that may be implemented, such as a load control system for example.

As those of skill in the art will appreciate, the transfer switch assembly of the present invention can withstand the entire load draw of a building while being small enough to fit inside a meter socket adapter. This permits the transfer switch assembly to be installed ahead of the service entrance, thereby obviating certain disadvantages of previous transfer switches.

The above-described embodiments of the present invention are intended to be examples only. Alterations, modifications and variations can be effected to the particular embodiments by those of skill in the art without departing from the scope of the invention, which is defined solely by the claims appended hereto.

The invention claimed is:

1. A power transfer switch assembly modularly attachable to a service installation, for selectively connecting one of a main power supply and an alternate power supply to a power load comprising:

a first power switch including an electro-mechanically-held device for actuating the mechanical switching elements between an ON state and an OFF state, for receiving the main power supply and for coupling the main power supply to the power load in the ON state;

a second power switch including an electro-mechanically-held device for actuating the mechanical switching elements between an ON state and an OFF state, for receiving the alternate power supply and for coupling the alternate power supply to the power load in the ON state;

a mechanical interlock having a locking actuator mechanically coupled to the first and the second power switches for physically preventing the first power switch and the second power switch from assuming simultaneous ON states, the locking actuator having a pair of L-shaped tabs that are in sliding engagement with the body of the mechanical inter lock;

a controller for monitoring the main power supply and switching the first power switch to the OFF state and the second power switch to the ON state when a disturbance in the main power supply is detected, the controller switching the second power switch to the OFF state and the first power switch to the ON state when the main power supply is restored; and, a casing containing the first power switch, the second power switch, the mechanical interlock and the controller, the casing having load terminals and line terminals for connection with a meter socket of the service installation, and line out and line in feed terminals for connection with a watt-hour meter of the service installation, the load terminals being connected to the first and second power switches, the line terminals being connected to the line out feed terminals, and the line in feed terminals being connected to the first power switch.

2. The power transfer switch assembly of claim 1, wherein the casing receives the main power supply from the line terminals and the alternate power supply from a cable.

3. The power transfer switch assembly of claim 1, wherein the controller includes a remote communication system for exchanging information of a status of the switch, giving position, generator status and normal supply status with a remote interface unit.

4. The power transfer switch assembly of claim 3, wherein the remote communication system includes hard wired twisted pair communications cable.

5. The power transfer switch assembly of claim 3, wherein the remote communication system includes a power line communications modem.

6. The power transfer switch assembly of claim 3, wherein the remote communication system includes a wireless radio frequency modem.

7. The power transfer switch assembly of claim 3, wherein the remote interface unit includes a stand-alone user interface display.

8. The power transfer switch assembly of claim 3, wherein the remote interface unit includes a personal computing device.

9. The power transfer switch assembly of claim 8, wherein the personal computing device includes a personal computer.

10. The power transfer switch assembly of claim 8, wherein the personal computing device includes a personal digital assistant.

11. The power transfer switch assembly of claim 1, wherein the electro-mechanically-held device is a solenoid.

12. A power transfer switch assembly modularly attachable to a service installation, for selectively connecting one of a main power supply and an alternate power supply to a power load comprising:

a first power switch including an electro-mechanically-held device for actuating the mechanical switching elements between an ON state and an OFF state, for receiving the main power supply and for coupling the main power supply to the power load in the ON state;

a second power switch including an electro-mechanically-held device for actuating the mechanical switching elements between an ON state and an OFF state, for receiving the alternate power supply and for coupling the alternate power supply to the power load in the ON state;

a mechanical interlock having a rocking bar mechanically coupled to the first and the second power switches for physically preventing the first cover switch and the second power switch from assuming simultaneous ON states, the rocking bar being pivotally connected, through a central pivot, to the walls of a U-shaped bracket having its ends secured to the bodies of both power switches, the ends of the rocking bar being in contact with a respective actuator pin;

a controller for monitoring the main power supply and switching the first power switch to the OFF state and the second power switch to the ON state when a disturbance in the main power supply is detected, the controller switching the second power switch to the OFF state and the first cover switch to the ON state when the main power supply is restored; and a casing containing the first power switch, the second power switch, the mechanical interlock and the controller, the casing having load terminals and line terminals for connection with a meter socket of the service installation, and line out and line in feed terminals for connection with a watt-hour meter of the service installation, the load terminals being connected to the first and second power switches, the line terminals being connected to the line out feed terminals, and the line in feed terminals being connected to the first cover switch.

* * * * *